United States Patent
Gao et al.

(10) Patent No.: US 12,022,324 B2
(45) Date of Patent: Jun. 25, 2024

(54) METHODS AND SYSTEM FOR TRANSMITTING A TEMPORARY IDENTIFIER

(71) Applicant: ZTE Corporation, Guangdong (CN)

(72) Inventors: Yuan Gao, Guangdong (CN); Feng Xie, Guangdong (CN); He Huang, Guangdong (CN); Wenting Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/945,787

(22) Filed: Sep. 15, 2022

(65) Prior Publication Data

US 2023/0020819 A1  Jan. 19, 2023

Related U.S. Application Data

(63) Continuation of application No. 16/940,849, filed on Jul. 28, 2020, now Pat. No. 11,483,736, which is a continuation of application No. PCT/CN2018/080887, filed on Mar. 28, 2018.

(51) Int. Cl.
*H04W 28/06* (2009.01)
*H04W 74/0833* (2024.01)
*H04W 76/11* (2018.01)

(52) U.S. Cl.
CPC ....... *H04W 28/06* (2013.01); *H04W 74/0833* (2013.01); *H04W 76/11* (2018.02)

(58) Field of Classification Search
CPC ............. H04W 74/0833; H04W 76/11; H04W 74/0841; H04W 28/06; H04L 61/6054; H04L 61/103

See application file for complete search history.

(56) References Cited

U.S. PATENT DOCUMENTS

| | | | |
|---|---|---|---|
| 8,406,180 B2 | 3/2013 | Park et al. |
| 10,448,290 B2 | 10/2019 | Takahashi et al. |
| 10,524,166 B2 | 12/2019 | Youn et al. |
| 11,419,160 B2 | 8/2022 | Wang et al. |
| 2009/0262681 A1 | 10/2009 | Park et al. |
| 2010/0067495 A1 | 3/2010 | Lee et al. |
| 2016/0295398 A1 | 10/2016 | Ketheesan et al. |

(Continued)

FOREIGN PATENT DOCUMENTS

| | | |
|---|---|---|
| CN | 107251642 B | 8/2020 |
| CN | 109802809 B | 2/2021 |

(Continued)

OTHER PUBLICATIONS

Alcatel-Lucent, "Proposed way forward on Establishment cause values", 3GPP TSG RAN WG2 #62, Kansas City, United States of America, R2-082692, 4 pages, May 2008.

(Continued)

*Primary Examiner* — Syed Ali

(74) *Attorney, Agent, or Firm* — Perkins Coie LLP

(57) ABSTRACT

Various implementations of a method for transmitting a temporary identifier involve a wireless communication device: transmitting a first portion of a temporary identifier of the wireless communication device to a radio access network in a first message; and transmitting a second portion of the temporary identifier to the radio access network in a second message.

8 Claims, 4 Drawing Sheets

(56) References Cited

U.S. PATENT DOCUMENTS

| | | | |
|---|---|---|---|
| 2019/0124561 A1* | 4/2019 | Faccin | H04W 48/18 |
| 2019/0144576 A1 | 5/2019 | Lue et al. | |
| 2019/0150218 A1* | 5/2019 | Futaki | H04W 76/27 |
| | | | 370/329 |
| 2019/0174449 A1 | 6/2019 | Shan et al. | |
| 2019/0174576 A1 | 6/2019 | Palat et al. | |
| 2020/0100088 A1* | 3/2020 | Kim | H04W 48/16 |
| 2020/0120742 A1 | 4/2020 | Mildh et al. | |
| 2020/0228987 A1 | 7/2020 | Ben Henda et al. | |
| 2020/0267539 A1 | 8/2020 | Tamura et al. | |
| 2020/0267634 A1* | 8/2020 | Kim | H04W 48/16 |
| 2020/0351816 A1 | 11/2020 | Persson et al. | |
| 2020/0367224 A1 | 11/2020 | Persson et al. | |
| 2021/0014781 A1 | 1/2021 | Ianev et al. | |
| 2021/0029776 A1 | 1/2021 | Tiwari et al. | |
| 2022/0022121 A1 | 1/2022 | Eklöf et al. | |
| 2022/0201550 A1 | 6/2022 | Tiwari et al. | |

FOREIGN PATENT DOCUMENTS

| | | |
|---|---|---|
| CN | 109155949 B | 6/2021 |
| EP | 3432641 A1 | 1/2019 |
| EP | 3373692 B1 | 3/2020 |
| EP | 3697123 A1 | 8/2020 |
| EP | 3709551 A1 | 9/2020 |
| KR | 101384865 B1 | 4/2014 |
| WO | 2007148917 A2 | 12/2007 |
| WO | 2008084949 A1 | 7/2008 |
| WO | 2017077979 A1 | 5/2017 |

OTHER PUBLICATIONS

Ericsson, "Message 3.5 in LTE connected to 5GC", 3GPP TSG-RAN WG2 #101, Athens, Greece, R2-1802632, 4 pages, Mar. 2, 2018.

International Search Report and Written Opinion dated Jan. 2, 2019 for International Application No. PCT/CN2018/080887, filed on Mar. 28, 2018 (7 pages).

Oppo, "Discussion UE Identifier Definition in RRC Signalling in eLTE", 3GPP TSG-RAN WG2#101, Athens, Greece, R2-1801776, 4 pages, Mar. 2018.

SA2, "LS on 5G-S-TMSI code space", SA WG2 Meeting #S2-126, Montreal, Canada, S2-182964, 1 page, Mar. 2018.

Supplementary European Search Report for EP Patent Application No. 18911922.5, dated Mar. 15, 2021, 6 pages.

Huawei et al: "On potential issues for signalling Msg3 size", 3GPP Draft; R2-1706464 on Potential Issues for Signalling MSG3 Size, 3rd Generation Partnership Project (3GPP), Mobile Competence Centre; 650, Route Des Lucioles ; F-06921 Sophia-Antipolis Cedex; FR vol. RAN WG2, no. Qingdao, China; Jun. 27, 2017-Jun. 29, 2017, Jun. 26, 2017 (Jun. 26, 2017), XP051300970, Retrieved from the Internet: URL:http://www.3gpp.org/ftp/Meetings_3GPP_SYNC/RAN2/Docs/ [retrieved on Jun. 26, 2017] 5 pages.

Ericsson, "Handling of Collision between UE Identifiers in LTE connected to 56C," 3GPP TSG-RAN WG2 #101, 2-1802631, Athens, Greece, Feb. 26-Mar. 2, 2018, 6 pages.

ZTE, "Consideration on extending the code space for 5G-S-TMSI," 3GPP TSG-RAN WG2 Meeting#101bis, R2-1804461, Sanya, China, Apr. 16-20, 2018, 4 pages.

European Search Report for EP Patent Application No. 22157752.1, dated Sep. 19, 2022, 10 pages.

Ericsson, "5GS Temporary Identifiers and mapping—Requirements," SA WG2 Temporary Document, SA WG2 Meeting #126, S2-181889, Feb. 26-Mar. 2, 2018, Montreal, Canada, revision of S2-18xxxx), 3 pages.

ZTE et al., "23.501: Network Slicing clause 5.15.5—Early vs. Late Binding of UE with the associated NSI corresponding to Allowed S-NSSAI," SA WG2 Temporary Document, SA WG2 Meeting #112bis, proposed S2-176633, Aug. 21-25, 2017, Sophia Antipolis, France, revision of S2-17xxxx, 10 pages.

Huawei et al., "Discussion on network identifiers," 3GPP TSG-RAN WG2 Meeting #101, R2-1802517, Athens, Greece, Feb. 26-Mar. 2, 2018, 2 pages.

Huawei et al., "Discussion on 2-step RACH Procedure," 3GPP TSG-RAN2 Meeting #96, R2-167588, Reno, USA, Nov. 14-18, 2016, 3 pages.

Nokia et al., "Considerations on NR RACH procedures," 3GPP TSG-RAN WG2 Meeting #96, R2-168013, Reno, USA, Nov. 14-18, 2016, 5 pages.

Alcatel-Lucent, "Proposed way forward on Establishment cause values," 3GPP TSG RAN WG2 #62, R2-082393, May 5-9, 2008, Kansas City, USA, 3 pages.

Motorola, "Proposal for Establishment Cause Values," TSG-RAN WG2 Meeting #62, R2-082608, Kansas City, USA, May 5-9, 2008, 4 pages.

ZTE Corporation et al., "On 2-step RACH procedure in NR," 3GPP TSG RAN WG1 Meeting #87, R1-1611274, Reno, USA, Nov. 14-18, 2016, 4 pages.

3GPP TS 23.003 V15.3.0 (Mar. 2018), Technical Specification, 3rd Generation Partnership Project; Technical Specification Group Core Network and Terminals; Numbering, addressing and identification (Release 15), 118 pages.

Intel Corporation, "5G network identifiers," 3GPP TSG RAN WG2 Meeting #101, R2-1802944, Athens, Greece, Feb. 26-Mar. 2, 2018, 4 pages.

3GPP TS 36.331 V14.5.1 (Jan. 2018), Technical Specification, 3rd Generation Partnership Project; Technical Specification Group Radio Access Network; Evolved Universal Terrestrial Radio Access (E-UTRA); Radio Resource Control (RRC); Protocol specification (Release 14), 764 pages.

3GPP TS 38.321 V15.0.0 (Dec. 2017), Technical Specification, 3rd Generation Partnership Project; Technical Specification Group Radio Access Network; NR; Medium Access Control (MAC) protocol specification (Release 15), 55 pages.

* cited by examiner

METHODS AND SYSTEM FOR TRANSMITTING A TEMPORARY IDENTIFIER

CROSS REFERENCE TO RELATED APPLICATIONS

This patent document is a continuation of U.S. patent application Ser. No. 16/940,849, filed on Jul. 28, 2020, which is a continuation of and claims benefit of priority to International Patent Application No. PCT/CN2018/080887, filed on Mar. 28, 2018. The entire contents of the before-mentioned patent applications are incorporated by reference as part of the disclosure of this application.

TECHNICAL FIELD

The present disclosure is related generally to wireless networks and, more particularly, to methods and systems for transmitting and/or obtaining a temporary identifier.

BACKGROUND

In many current wireless networks (e.g., those of the major wireless carriers), when a user equipment ("UE") attempts to access a radio access network ("RAN") (e.g., after the UE is powered on), one of the first tasks carried out by the UE is to engage in a random access procedure. At the end of the random access procedure, the UE establishes a radio resource control ("RRC") connection with the RAN. In doing so, the UE may identify itself using a temporary UE ID, which allows the core network ("CN") to know who the subscriber is without the necessity of the UE providing the international mobile subscriber identity ("IMSI"), which can compromise the security of the UE. The CN maintains a mapping between the temporary UE ID and the IMSI.

DRAWINGS

While the appended claims set forth the features of the present techniques with particularity, these techniques, together with their objects and advantages, may be best understood from the following detailed description taken in conjunction with the accompanying drawings of which:

DESCRIPTION

The disclosure is generally directed to a method and system for transmitting and receiving a temporary identifier. According to various embodiments, a temporary identifier of a UE is divided into two parts and transmitted from the UE to a node of a RAN via separate messages—one part of the UE temporary identifier in a first message and the other part in a second message.

According to various embodiments, a method for transmitting a temporary identifier involves a wireless communication device: transmitting a first portion of a temporary identifier of the wireless communication device to a radio access network in a first message; and transmitting a second portion of the temporary identifier to the radio access network in a second message.

In an embodiment, the method further includes the device receiving, from the radio access network, a contention resolution message containing the first portion.

One of the first and second messages may be a radio resource control connection request message and a radio resource control connection setup complete message According to various embodiments, the first portion is a plurality of least significant bits of the temporary identifier and the second portion is a plurality of the most significant bits of the temporary identifier.

In an embodiment, the least significant bits include a temporary mobile subscriber identity and an access and mobility management function pointer.

According to an embodiment, the least significant bits include the least significant bits of an access and mobility management function set identifier and the most significant bits include the most significant bits of the access and mobility management function set identifier.

Figure 1:
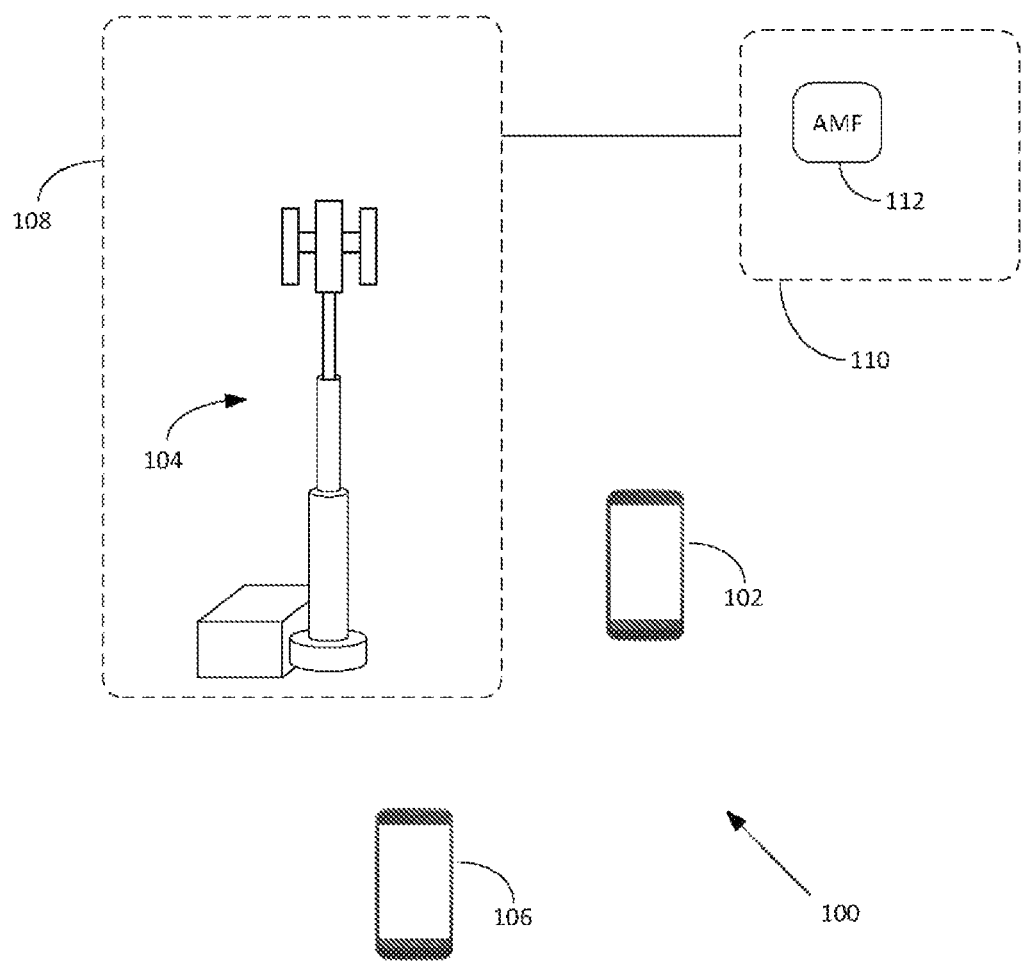
FIG. 1 is a diagram of a system in which various embodiments of the disclosure are implemented.

FIG. 1 depicts a communication system 100 in which the various embodiments described herein may be implemented. The communication system 100 includes several wireless communication devices ("wireless communication device" will sometimes be shortened herein to "communication device" or "device" for convenient reference). The communication devices depicted are a first communication device 102 (depicted as a user equipment ("UE")), a second communication device 104 (depicted as a base station), and a third communication device 106 (depicted as a UE). It is to be understood that there may be many other communication devices and that the ones represented in FIG. 1 are meant only for the sake of example. In an embodiment, the wireless communication system 100 has many other components that are not depicted in FIG. 1, including other base stations, other UEs, wireless infrastructure, wired infrastructure, and other devices commonly found in wireless networks. Possible implementations of the communication devices include any device capable of wireless communication, such as a smartphone, tablet, laptop computer, and non-traditional devices (e.g., household appliances or other parts of the "Internet of Things"). When operating as part of a wireless communication system (e.g., part of a radio access network), a wireless communication device may be referred to as a "wireless network node." A wireless communication device communicates primarily by transmitting and receiving wireless signals.

The second communication device 104 operates as a node of a RAN (such as a "Node B" of a fourth generation or fifth generation RAN) 108. The RAN 108 is communicatively linked to a CN 110. The CN 110 carries are many functions in support of the RAN 108 and has many components, including an Access and Mobility Management Function ("AMF") 112. It is to be understood that the "function" carried out by the AMF 112 is, in fact, carried out by one or more actual computing devices (e.g., under the control of software). Thus, all references herein to an AMF are to be understood as being references to a piece of computer hardware (e.g., one or more computing devices).

The following description will sometimes refer to a node and a UE without specific reference to FIG. 1. It is to be understood, however, that all of the methods described herein may be carried out by the communication devices of FIG. 1, and that references to a node, base station, and UE in a general manner are merely for convenience. Also, for each of the procedures described, in an embodiment, the steps are carried out in the order that the language sets forth. In other embodiments, the steps are carried out in different orders.

Figure 2:
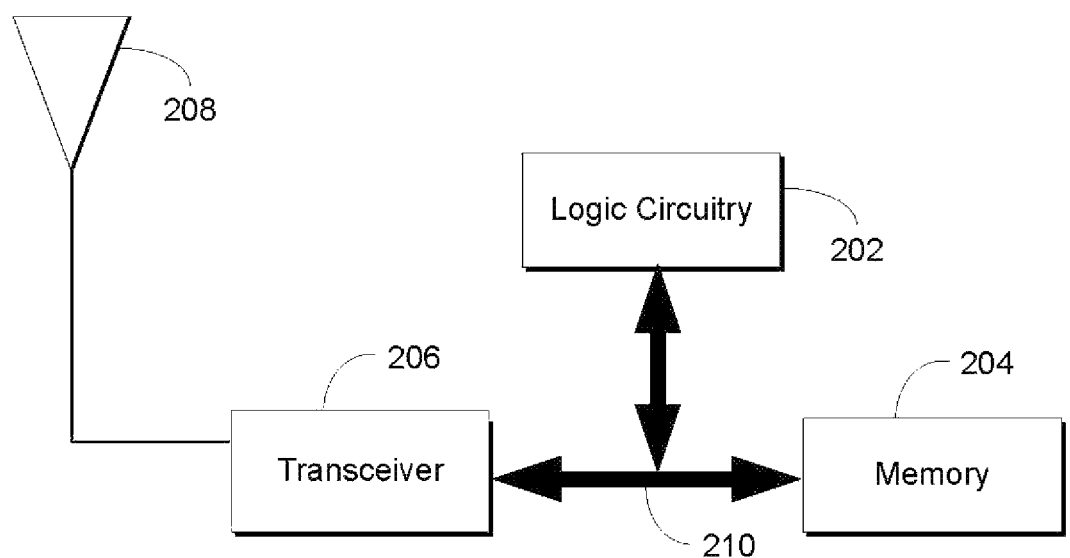
FIG. 2 shows an example hardware architecture of a communication device.

FIG. 2 illustrates a basic hardware architecture implemented by each of the wireless communication devices of FIG. 1, including the AMF 112, according to an embodiment. The elements of FIG. 1 may have other components as well. The hardware architecture depicted in FIG. 2 includes logic circuitry 202, memory 204, transceiver 206, and one or more antennas represented by antenna 208 (including transmit antennas and/or receive antennas). The memory 204 may be or include a buffer that, for example, holds incoming transmissions until the logic circuitry is able to process the transmission. Each of these elements is communicatively linked to one another via one or more data pathways 210. Examples of data pathways include wires, conductive pathways on a microchip, and wireless connections. The hardware architecture of FIG. 2 may also be referred to herein as a "computing device."

The term "logic circuitry" as used herein means a circuit (a type of electronic hardware) designed to perform complex functions defined in terms of mathematical logic. Examples of logic circuitry include a microprocessor, a controller, or an application-specific integrated circuit. When the present disclosure refers to a device carrying out an action, it is to be understood that this can also mean that logic circuitry integrated with the device is, in fact, carrying out the action.

In many existing wireless networks, an RRC connection request is used to deliver the temporary UE ID to network node, which the network node uses for contention resolution. The RRC connection request is sent over signaling radio bearer 0 ("SRB0") using the uplink ("UL") common control channel ("CCCH"), i.e., random access message 3 ("MSG3"). Because SRB0 uses radio link control ("RLC") transparent mode ("TM") and hence lacks segmentation, the whole RRC protocol data unit ("PDU") needs to be sent within a single transport block, which limits its size. The size of the transport block is determined by the number of bits that can be reliably delivered to a UE at the cell edge, and can be as low as 56 bits in some deployments. After removing the media access control ("MAC"), RLC, and the packet data convergence protocol ("PDCP") overhead, only 48 bits remain for the actual RRC PDU.

It has been proposed to extend the temporary UE ID to 48 bits. With such an extension, the temporary UE ID will not fit within MSG3, particularly because other elements need to be transmitted in the RRC connection request (e.g., the establishment cause).

In some recent versions of long-term evolution ("LTE") networks, the RRC "resume" process uses a truncated version of the Resume ID to fit into a 56-bit MSG3. The Truncated Resume ID impacts performance because it reduces the number of connections that can be suspended per the base station and the area in which a connection can be resumed.

In order to address this issue, in an embodiment, a temporary identifier for a wireless communication device (e.g., a UE) is divided into two parts. The wireless communication device ("device") transmits the first part ("first portion") via RRC Connection Request message. The device transmits the second part ("second portion") via RRC Connection Setup Complete message. Although examples of particular sizes for the first and second portions have been set forth herein, it is to be understood that other sizes may also be used.

Figure 3A:
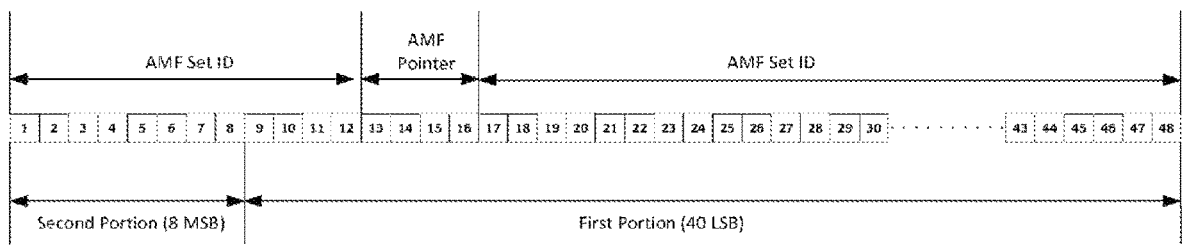
FIG. 3A and FIG. 3B are examples of possible structures of a temporary identifier.

Turning to FIG. 3A, an example of a temporary identifier (e.g., fifth generation system architecture evolution TMSI ("5G-S-TMSI")) configured according to an embodiment is shown. In this example, the temporary identifier has the following structure:

<5G-S-TMSI>=<AMF Set ID><AMF Pointer><5G-TMSI> where the AMF Set ID is 12 bits in length,
the AMF Pointer is 4 bits in length,
and the 5G-TMSI is 32 bits in length.

In this embodiment, the temporary identifier (e.g., the 5G-S-TMSI) is divided into two parts: the 40 least significant bits ("LSB") and the 8 most significant bits ("MSB"). The wireless communication device transmits the 40 LSB via an RRC Connection Request message. The 40 LSB transmitted in the RRC Connection Request message include:

<5G-TMSI>: 32 bits
<AMF Pointer>: 4 bits
<AMF Set ID>: 4 LSB

For initial access, the 40 LSB can be used (e.g., by the RAN) for contention resolution.

The wireless communication device (e.g., UE) transmits the 8 MSB bits of the temporary identifier via an RRC Connection Setup Complete message. The 8 MSB transmitted in the RRC Connection Setup Complete message include:

<AMF Set ID>: 8 MSB

Figure 3B:
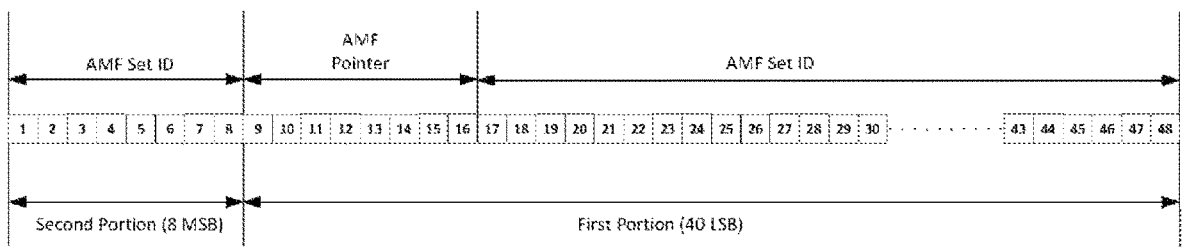

Turning to FIG. 3B, an example of a temporary identifier (e.g., 5G-S-TMSI) configured according to an embodiment is shown. In this example, the temporary identifier has the following structure:

<5G-S-TMSI>=<AMF Set ID><AMF Pointer><5G-TMSI> where the AMF Set ID is 8 bits in length,
the AMF Pointer is 8 bits in length,
and the 5G-TMSI is 32 bits in length.

In this embodiment, the wireless communication device transmits the 40 LSB in the RRC Connection Request message. The 40 LSB include:

<5G-TMSI>: 32 bits
<AMF Pointer>: 8 bits

The wireless communication device transmits the 8 MSB of the temporary identifier via an RRC Connection Setup Complete message. The 8 MSB transmitted in RRC Connection Setup Complete message in this embodiment include:

<AMF Set ID>: 8 bits

As in the previously described embodiment, the 40 LSB of the temporary identifier can be used (e.g., by the RAN) for contention resolution.

Figure 4:
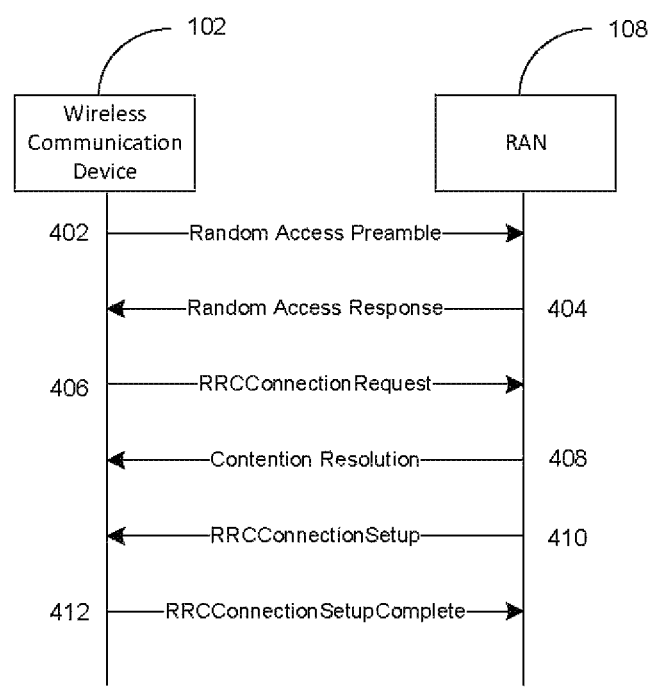
FIG. 4 is a communication flow diagram of a procedure for transmitting and receiving a temporary identifier, according to an embodiment.

Turning to FIG. 4, an example of an initial access procedure carried out according to an embodiment will now be described.

At 402, the wireless communication device 102 transmits a Random Access Preamble on a random access channel ("RACH") in a UL transmission to the RAN 108 (e.g., via a node of the RAN 108, such as the wireless communication device 104).

At 404, the RAN 108 transmits a Random Access Response (e.g., transmitted via the MAC layer and on the downlink shared channel ("DL-SCH")) to the wireless communication device 102.

At 406, the wireless communication device 102 transmits on the first scheduled UL transmission on the uplink shared channel ("UL-SCH") to the RAN 108. The transmission includes the RRC Connection Request (e.g., generated by the wireless communication device 102 at the RRC layer and transmitted via the CCCH). The RRC Connection Request includes the 40 LSB of the temporary identifier (e.g., of the 5G-S-TMSI, including the 32-bit 5G-TMSI and the 8-bit AMF Pointer (if using the implementation of FIG. 3B) or the 4-bit AMF pointer and 4 bits of the AMF Set ID (if using the implementation of FIG. 3A)) and an establishment cause.

At 408, the RAN 108 transmits a Contention Resolution to the wireless communication device 102 on the downlink ("DL"). It should be noted that a hybrid automatic repeat request ("HARQ") feedback is only transmitted by the wireless communication device 102 (e.g., UE) if it detects its own identity (i.e., in the 40 LSB of the temporary identifier), as provided in the RRC Connection Request message, echoed in the Contention Resolution message.

At 410, the RAN 108 establishes signaling radio bearer 1 ("SRB1") by transmitting an RRC Connection Setup message to the wireless communication device 102.

At 412 the wireless communication device 102 confirms the successful completion of the establishment of an RRC connection. The wireless communication device 102 does so by transmitting an RRC Connection Setup Complete message via a dedicated control channel ("DCCH") to transfer the initial non-access stratum ("NAS") dedicated information/message to the RAN 108. The RRC Connection Setup Complete message includes the 8 MSB of the temporary identifier (e.g., of the 5G-S-TMSI) (which include the AMF Set ID, if using the implementation of FIG. 3B, or the remaining 8 bits of the AMF Set ID, if using the implementation of FIG. 3A).

After transmission of Connection Setup Complete message, the wireless communication device 102 transmits the entire temporary identifier to the RAN 108, providing an unambiguous identification of the wireless communication device and allowing the identification of the AMF (e.g., the AMF 112) and the network (e.g., the RAN 108). It can be used by the network and the wireless communication device to establish the identity of the device during signaling between them.

According to another embodiment, a wireless communication device (e.g., UE) provides a temporary identifier as follows: the device (a) transmits a random value (e.g., for contention resolution) to the RAN (e.g., via a CCCH message. such as an RRC Connection Request), and (b) subsequently transmits the entire temporary identifier (e.g., the 5G-S-TMSI) to the RAN (e.g., via a DCCH message, such as an RRC Connection Setup Complete message).

According to an embodiment, when the size of the temporary identifier (e.g., 5G-S-TMSI) is larger than 40 bits, the wireless communication device transmits a 40-bit random value via an RRC Connection Request message for contention resolution. Then, the wireless communication device transmits the entire temporary identifier (e.g., the 5G-S-TMSI) to the RAN via an RRC Connection Setup Complete message.

Regardless of the temporary identifier size, in various embodiments, the wireless communication device transmits a random value via an RRC Connection Request message for contention resolution. Then, the wireless communication device transmits the entire temporary identifier (e.g., the 5G-S-TMSI) to the RAN via an RRC Connection Setup Complete message.

Referring again to FIG. 4, in an embodiment, a procedure for providing a temporary identifier is as follows:

At 402, the wireless communication device 102 transmits a Random Access Preamble on a RACH in a UL transmission to the RAN 108 (e.g., via a node of the RAN 108, such as the wireless communication device 104).

At 404, the RAN 108 transmits a Random Access Response (e.g., transmitted via the MAC layer and on the DL-SCH) to the wireless communication device 102.

At 406, the wireless communication device 102 transmits on the first scheduled UL transmission on the UL-SCH to the RAN 108. The transmission includes the RRC Connection Request (e.g., generated by the wireless communication device 102 at the RRC layer and transmitted via the CCCH). The RRC Connection Request includes a 40-bit random value and an establishment cause. The 40-bit random value will be used as an identifier for the wireless communication device 102 for contention resolution.

At 408, the RAN 108 transmits a Contention Resolution to the wireless communication device 102 on DL. It should be noted that a HARQ feedback is only transmitted by the wireless communication device 102 (e.g., UE) if it detects its own identity (i.e., in the 40-bit random value), as provided in the RRC Connection Request message, echoed in the Contention Resolution message.

At 410, the RAN 108 establishes signaling radio bearer 1 ("SRB1") by transmitting an RRC Connection Setup message to the wireless communication device 102.

At 412 the wireless communication device 102 confirms the successful completion of the establishment of an RRC connection. The wireless communication device 102 does so by transmitting an RRC Connection Setup Complete message via the DCCH to transfer the initial NAS dedicated information/message to the RAN 108. The RRC Connection Setup Complete message includes the entire temporary identifier (e.g., the entire 5G-S-TMSI).

After transmission of Connection Setup Complete message, the wireless communication device 102 transmits the entire temporary identifier to the RAN 108, providing an unambiguous identification of the wireless communication device and allowing the identification of the AMF (e.g., the AMF 112) and the network (e.g., the RAN 108). It can be used by the network and the wireless communication device to establish the identity of the device during signaling between them.

Any and all of the methods described herein are carried out by or on one or more computing devices. Furthermore, instructions for carrying out any or all of the methods described herein may be stored on a non-transitory, computer-readable medium, such as any of the various types of memory described herein.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope of as defined by the following claims. For example, the steps of the various methods can be reordered in ways that will be apparent to those of skill in the art.

What is claimed is:

1. A method for wireless communication, comprising:
   transmitting, by a wireless communication device, a random value to a radio access network in a Radio Resource Control (RRC) request message, wherein the random value is an identifier for the wireless communication device for contention resolution in a random access procedure;
   receiving, by the wireless communication device in response to the RRC request message, an RRC Setup message from the radio access network; and transmitting, by the wireless communication device, an entirety of a temporary identifier of the wireless communication device to the radio access network in a RRC Setup complete message confirming a successful completion of an RRC connection establishment, wherein the temporary identifier is a 5G-S-TMSI that comprises a temporary mobile subscriber identity and access and mobility management function information, wherein the access and mobility management function information comprises an access and mobility management function pointer and an access and mobility management function set identifier.

2. The method of claim 1, further comprising:
receiving, from the radio access network, a second message including the random value.

3. A method for wireless communication, comprising:
receiving, by a node in a radio access network, a random value from a wireless communication device in a Radio Resource Control (RRC) request message, wherein the random value is an identifier for the wireless communication device for contention resolution in a random access procedure;
transmitting, by the node in response to the RRC request message, an RRC Setup message to the wireless communication device; and
receiving, by the node, an entirety of a temporary identifier of the wireless communication device from the wireless communication device in a RRC setup complete message confirming a successful completion of an RRC connection establishment, wherein the temporary identifier is a 5G-S-TMSI that comprises a temporary mobile subscriber identity and access and mobility management function information, wherein the access and mobility management function information comprises an access and mobility management function pointer and an access and mobility management function set identifier.

4. The method of claim 3, further comprising:
transmitting, to the wireless communication device, a second message including the random value.

5. An apparatus for wireless communication, comprising a processor that is configured to:
transmit a random value to a radio access network in a Radio Resource Control (RRC) request message, wherein the random value is an identifier for the apparatus for contention resolution in a random access procedure;
receive, in response to the RRC request message, an RRC Setup message from the radio access network; and
transmit an entirety of a temporary identifier of the apparatus to the radio access network in a RRC setup complete message confirming a successful completion of an RRC connection establishment, wherein the temporary identifier is a 5G-S-TMSI that comprises a temporary mobile subscriber identity and access and mobility management function information, wherein the access and mobility management function information comprises an access and mobility management function pointer and an access and mobility management function set identifier.

6. The apparatus of claim 5, wherein the processor is configured to:
receive, from the radio access network, a second message including the random value.

7. An apparatus for wireless communication, comprising a processor that is configured to:
receive a random value from a wireless communication device in a Radio Resource Control (RRC) request message, wherein the random value is an identifier for the wireless communication device for contention resolution in a random access procedure;
transmit, in response to the RRC request message, an RRC Setup message to the wireless communication device; and
receive an entirety of a temporary identifier of the wireless communication device from the wireless communication device in a RRC setup complete message confirming a successful completion of an RRC connection establishment, wherein the temporary identifier is a 5G-S-TMSI that comprises a temporary mobile subscriber identity and access and mobility management function information, wherein the access and mobility management function information comprises an access and mobility management function pointer and an access and mobility management function set identifier.

8. The apparatus of claim 7, further comprising:
transmitting, to the wireless communication device, a second message including the random value.

* * * * *